United States Patent [19]

Westergaard et al.

[11] Patent Number: 5,768,367
[45] Date of Patent: Jun. 16, 1998

[54] METHOD AND APPARATUS FOR REMOVING FSK IN-BAND SIGNALING

[75] Inventors: David Jeffrey Westergaard; Robert Barrie Turnbull; Timothy Augustus Kuechler; Aaron James Bobick, all of Calgary, Canada

[73] Assignee: Northern Telecom Limited, Montreal, Canada

[21] Appl. No.: 730,829

[22] Filed: Oct. 17, 1996

[51] Int. Cl.⁶ ................................................. H04M 1/56
[52] U.S. Cl. ........................ 379/413; 379/142; 379/215; 379/258; 379/399
[58] Field of Search .................................. 379/399, 413, 379/323, 324, 142, 215, 258, 127, 351, 421, 398, 350, 377, 373, 201; 330/250; 323/280, 234, 273; 363/89

[56] References Cited

U.S. PATENT DOCUMENTS

| | | | |
|---|---|---|---|
| 4,549,129 | 10/1985 | Hing et al. | 323/280 |
| 4,581,487 | 4/1986 | Cochran | 379/413 |
| 5,263,084 | 11/1993 | Chaput et al. | 379/215 |
| 5,337,354 | 8/1994 | Gadsby | 379/399 |
| 5,526,406 | 6/1996 | Luneau | 379/67 |
| 5,574,777 | 11/1996 | Lewis | 379/106.01 |
| 5,583,924 | 12/1996 | Lewis | 379/106.01 |
| 5,686,820 | 11/1997 | Riggio, Jr. | 323/280 |
| 5,694,465 | 12/1997 | Apfel | 379/377 |

*Primary Examiner*—Krista Zele
*Assistant Examiner*—Jacques M. Saint-Surin
*Attorney, Agent, or Firm*—Jean-Pierre Fortin

[57] ABSTRACT

A circuit for use with a SCWID adjunct to remove A.C. in-band signaling tones from the voice path to a telephone apparatus serially connected to the adjunct. The A.C. signal component is carried on top of the D.C. voltage used to power the telephone. The circuit includes means to monitor the D.C. voltage level and to pass this voltage substantially unchanged to the telephone. The A.C. signal in the form of a FSK tone, received from the central office, is used by the adjunct to provide a subscriber with call feature information such as the identity of a calling party while the telephone is off-hook.

4 Claims, 2 Drawing Sheets

METHOD AND APPARATUS FOR REMOVING FSK IN-BAND SIGNALING

FIELD OF THE INVENTION

This invention relates to a Spontaneous Call Waiting Identification (SCWID) adjunct for receiving and displaying call feature information such as caller identity from a telephone system central office while a customer equipment attached to the adjunct is off-hook. More particularly, the invention relates to such an adjunct having means for removing the FSK caller identification signaling tone from the central office signal while maintaining the customer equipment in a connected state.

1. Background of the Invention

Call feature data such as SCWID has recently become available to subscribers having display equipped telephone terminal. In these systems a subscriber to the service is provided with information on the terminal display as to the identity of a calling third party while the subscriber is talking to a second party. The identity may be in the form of the third party's telephone number and/or the calling party's name, depending on the capabilities of the terminal's display. With this information the subscriber can decide to ignore the third party call, terminate the second party call, or place the second party call on hold and pick up the third party call. U.S. Pat. No. 5,263,084, which issued Nov. 16, 1993 to Chaput et al. provides greater details regarding SCWID features.

Many communications systems users have more than one terminal connected to the central office line and some of these terminals may have answering machines associated therewith. To allow subscribers to take advantage of the SCWID feature at any of the in-premise equipment locations without investing in an elaborate display terminal, an adjunct has been developed for use in association with a plain old telephone (POT). The adjunct has an appropriate display and control switches or push buttons as well as circuitry to monitor the central office line for CAS, customer alert signal, indicating that a particular call feature is available for implementation. The adjunct takes charge of the call by muting the terminal's handset in response to the CAS, returning an acknowledgement signal and receiving and interpreting the FSK (Frequency Shift Key) signal which contains data, for example, the identity of another caller to the subscriber's terminal. This data is displayed on the adjunct which will conveniently be located near to the POT. The subscriber will then be able to make a decision as to the handling of the waiting call and take appropriate action via the adjunct control switches.

It is a telephone system requirement that the terminal be muted while the central office transmits the FSK signal. Otherwise, the FSK tones, which are in-band would be extremely annoying to the terminal user.

2. Prior Art

One method of muting the POT during FSK signaling is to effectively disconnect the telephone from the adjunct while the FSK signal is being received. Unfortunately, disconnection of the telephone from the adjunct can result in the loss of certain functionality otherwise provided by the telephone. The effective disconnection or change in tip/ring voltage may be interpreted as an extension in use (EIU) or some equipment may drop a call on hold or a telephone answering machine may stop recording and drop a call.

In co-pending U.S. application Ser. No. 08/723321 filed Sep. 30, 1996 (Westergaard et al) an apparatus is disclosed wherein the power supply of the adjunct is used to provide a D.C. voltage to the terminal which voltage is substantially equal to the voltage to the terminal immediately prior to its disconnection. The voltage is held at the previous D.C. level for the duration of the mute function. The contents of the aforementioned Westergaard et al application are incorporated herein by reference.

SUMMARY OF THE INVENTION

It is an object of the present invention to remove the FSK in-band tone in a call feature information signal from the central office to a terminal via an adjunct.

It is a further object of the invention to maintain a D.C. voltage at the tip and ring terminals of a telephone connected to an adjunct while the adjunct receives FSK SCWID tones.

Therefore in accordance with a first aspect of the present invention there is provided in a SCWID adjunct connected between a communications line and a subscriber's telephone apparatus, the adjunct having means to receive and display call feature information received on the communications line in the form of an A.C. signaling tone component on a D.C. voltage, a circuit for removing the A.C. component while providing the D.C. voltage to the serially connected telephone apparatus. The circuit comprises a first voltage divider to establish a first voltage level indicative of the D.C. voltage; an operational amplifier having an inverting input, a non-inverting input, and an output, the non-inverting input being supplied with the first voltage level; a current control element connected to the operational amplifier output to control current through the circuit; a second voltage divider providing a second voltage level indicative of the current flowing through the circuit, the second voltage level being supplied to the inverting input of the operational amplifier through a feedback loop, whereby an increase in the A.C. component results in a decrease in current flow and a decrease in the A.C. component results in an increase in current flow such that the A.C. component is substantially removed from the D.C. voltage.

The A.C. signal is a frequency shift key (FSK) tone which includes the SCWID data.

In accordance with a second aspect of the present invention there is provided a method of removing an A.C. inband component from a call feature information signal provided by a central office to a subscriber's telephone apparatus via a SCWID adjunct. The method comprises supplying the information signal to a first voltage divider circuit whereby a first voltage level indication of the D.C. voltage of the information signal is generated, supplying the first voltage level to the non-inverting input of an operational amplifier, controlling current flowing through the circuit by supplying the operational amplifier output to a control element, establishing a second voltage level indicative of the current flow by passing the current through a second voltage divider and supplying the second voltage level to the inverting input of the operational amplifier via a feedback loop, whereby an increase in the A.C. component results in a decrease in current and a decrease in the A.C. component results in an increase in the current flow.

BRIEF DESCRIPTION OF THE DRAWINGS

The invention will now be described in greater detail with reference to the attached drawings wherein.

DETAILED DESCRIPTION OF THE INVENTION

Figure 1:
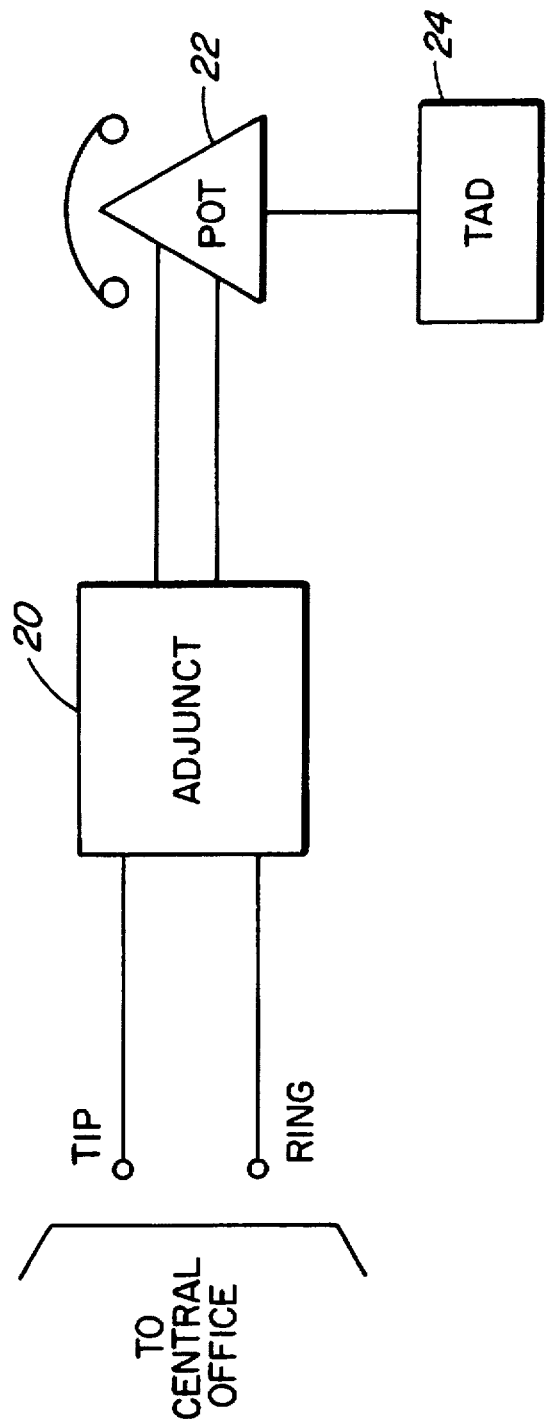
FIG. 1 is a block diagram of the system.

As shown in FIG. 1, SCWID adjunct 20 is connected to the central office via the tip and ring terminals. The adjunct preferably has a standard telephone jack (not shown) for connection to an in-building wall jack as is well known. The adjunct will also preferably have a second telephone jack for connecting the output of the adjunct to a subscriber's telephone 22. It is also possible to have attached to telephone 22 other apparatus such as a telephone answering device 24.

The adjunct 20 will have, in accordance with the SCWID call features protocol, means to receive a DTMF signal from the central office that a call is waiting for the subscriber while the subscriber's telephone is off-hook. The adjunct also has means to mute the receive and transmit paths of the terminal, return an acknowledgement signal to the central office, and eventually receive and interpret caller identification data from the central office and display this information on a display on the adjunct. As indicated previously the FSK Caller Identification, if permitted to enter the telephone voice path, would be extremely annoying to the user. On the other hand, if the telephone terminal is simply disconnected from the adjunct, the loss of or change in D.C. voltage to the terminal can have undesirable ramifications. These include an indication of an extension in use, the dropping of a call on hold, or the discontinuation of the recording of a message on a peripheral telephone answering device.

Figure 2:
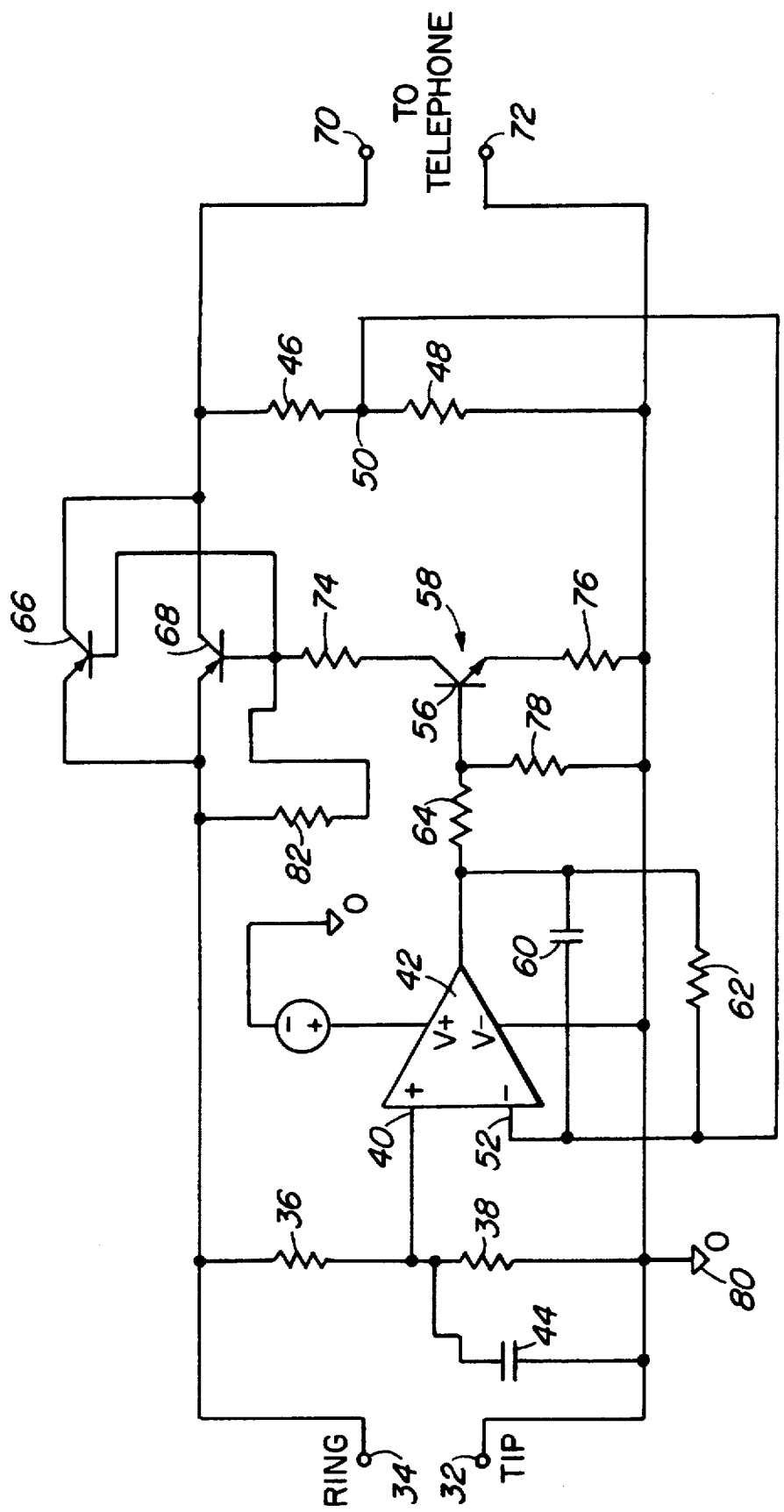
FIG. 2 is a schematic diagram of the circuit according to the invention.

A circuit for removing the FSK signal from the voice path is shown schematically in FIG. 2.

It is to be understood that this circuit, although shown in isolation, will in a preferred embodiment be included with the other circuit elements of the SCWID adjunct apparatus.

As shown, the tip and ring input terminals 32,34 respectively are configured to be connected to the tip and ring connections to the central office. The circuit is polarity sensitive and therefore a diode bridge (not shown) is included in front of terminals 32,34 so that the ring terminal 34 is considered positive and the tip terminal 32 is negative. The input to tip and ring terminals 32, when the circuit is active, i.e., the telephone connected to the adjunct is off-hook, is a D.C. voltage between 5 and 15 volts. When FSK signal tones are received from the central office, the signal appears as an A.C. component on top of the D.C. level. This voltage can be as high as one volt and as low as 50 mV with a nominal value of 300 mV. It is the function of the circuit to pass the D.C. voltage through to the serially connected telephone so that the functionality of the telephone will not be lost. At the same time, the A.C. component which is interpreted elsewhere at the adjunct to provide a visual indication of the calling party, for example, is removed from the D.C. so that the tone will not be heard by a user of the telephone.

The input signal appears across the voltage divider, made up of resistors 36 and 38. In a preferred embodiment, resistor 36 is 120KΩ and resistor 38 has a value of 40 KΩ. This provides a first voltage which is a D.C. reference of the input signal. This first voltage is supplied to the non-inverting input 40 of operational amplifier (op amp) 42. Capacitor 44, having a value of 6.8 μf, removes the in-band A.C. from the D.C. reference.

The voltage on the tip and ring lines 32,34 is also sampled by a second voltage divider comprising resistors 46,48 having values of 25 KΩ and 10 KΩ respectively. The sampled voltage at node 50 between the two resistors is supplied to the inverting input 52 of op amp 42. The output 54 of op amp 42 is used to source the base 56 of transistor 58. Capacitor 60 and resistor 62 provide stability to the output of op amp 42. Resistor 64 limits the output current of the op amp 42.

Transistor 58 controls the current through transistors 66 and 68 by controlling the amount of current drawn from the bases of these transistors.

When only D.C. is present on the tip and ring terminals, i.e., no FSK tones from the central office transistor 58 allows sufficient current to flow from the bases of transistors 66,68 to allow substantially the same D.C. voltage to appear at the output terminals 70 and 72 and hence to the serially connected telephone.

When the FSK tones appear as an A.C. signal on top of the D.C. voltage, the approximate D.C. level is determined by the voltage divider (resistors 36,38) and this voltage appears at input 40 of op amp 42.

The A.C. component of the FSK signal is sampled at the output by the voltage divider comprising resistors 46 and 48 and the voltage at node 50 is connected to the inverting input 52 of the op amp. When the positive half cycle of the A.C. gets through the pass element, transistors 66,68, the voltage at node 50 and the inverting input 52 increases and reduces the output of the op amp 42. Hence, less current is sourced by transistor 58 which, in turn, lowers the current through the pass element. The net effect is to remove the A.C. half cycle from the D.C. level. Conversely, when the negative half cycle of the A.C. is present, the relative inputs 40,52 of op amp 42 change so that more current is sourced by transistor 58 which increases the current through the pass element. This effectively eliminates the negative half cycle of the A.C. from the D.C. voltage.

It will be noted that the resistance ratio created by resistors 46 and 48 is slightly smaller than the ratio created by resistors 36 and 38. This is arranged so that D.C. output to the telephone needs to be lower than the lowest peak in the A.C. or the A.C. will be heard in the voice path of the telephone.

In FIG. 2, resistors 74 and 76 are provided to limit the current flow from the bases of the pass element transistors 66,68. Resistor 78 is used to draw some of the base current of transistor 58 to ground 80. Resistor 82 provides a bias for transistors 66 and 68.

In summary, a D.C. voltage at the tip and ring terminals 32,34 is passed through the circuit and appears at the telephone terminals 70,72 with only a slight reduction due to the voltage drop of the two transistors 66,68. An A.C. component, such as the SCWID FSK tones, is substantially removed from the D.C. so as not to enter the voice path of the telephone set 20.

Although a specific embodiment of the invention has been disclosed and illustrated, it will be apparent to one skilled in the art that numerous variations or alternatives can be introduced. It is intended, however, that the scope of the invention is limited only by the appended claims.

I claim:

1. In a SCWID adjunct connected between a communications line and a telephone set, the adjunct having means to receive and display call feature information received on the communications line in the form of an A.C. component on a D.C. voltage, a circuit for removing the A.C. component while providing the D.C. voltage to the serially connected telephone set, the circuit comprising:

a first voltage divider to establish a first voltage level indicative of said D.C. voltage;

an operational amplifier having as non-inverting input, an inverting input and an output, said non-inverting input receiving the first voltage level;

a control element connected to said output for controlling current through said circuit;

a second voltage divider providing a second voltage indicative of said current through said circuit, said second voltage supplied to the inverting input of the operational amplifier whereby an increase in the A.C. component decreases said current and a decrease in the A.C. component increases said current to generate a substantially constant D.C. voltage.

2. A circuit as defined in claim 1 the current control element being a transistor having its base connected to the output of the operational amplifier.

3. A circuit as defined in claim 2 the first and second voltage dividers being resistors wherein the resistance ratio created by the second voltage divider is less than resistance ratio of the first.

4. A method of removing from a D.C. voltage an A.C. in-band component of a call feature information signal provided by a telephone system central office to a subscriber's telephone apparatus via a SCWID adjunct, the method comprising the steps of:

supplying the information signal to a first voltage divider whereby a first voltage indicative of the D.C. level of the information signal is generated;

supplying the first voltage to the non-inverting input of an operational amplifier;

controlling current flowing through the circuit by supplying the operational amplifier output to a control element;

establishing a second voltage level indicative of current flow by passing the current through a second voltage divider; and supplying the second voltage to an inverting input of the operational amplifier via a feedback loop, whereby an increase in the A.C. component results in a decrease in current and a decrease in the A.C. component results in an increase in the current flow.

\* \* \* \* \*